UNITED STATES PATENT OFFICE.

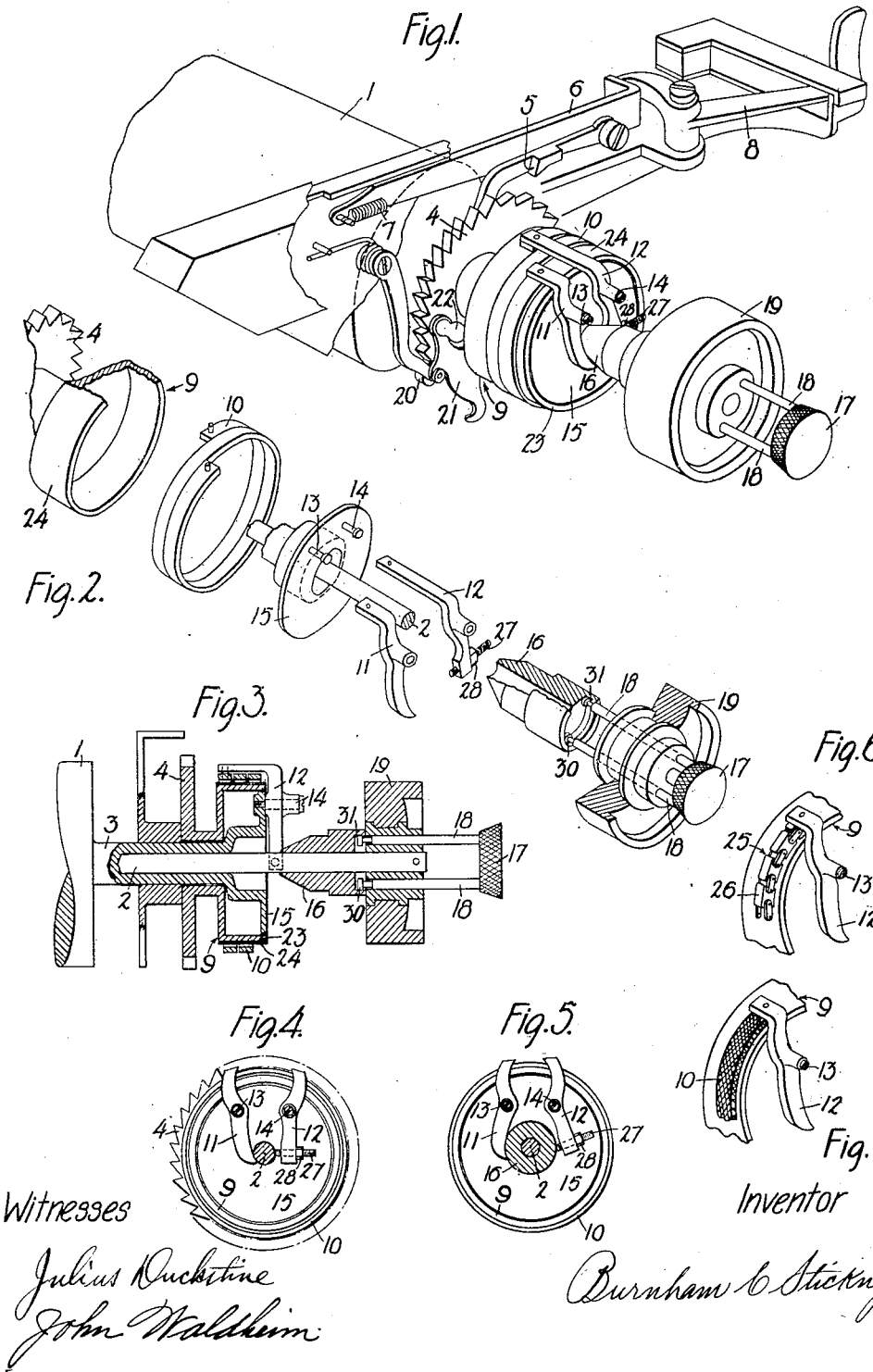

BURNHAM C. STICKNEY, OF ELIZABETH, NEW JERSEY, ASSIGNOR TO UNDERWOOD TYPEWRITER COMPANY, OF NEW YORK, N. Y., A CORPORATION OF DELAWARE.

TYPEWRITING-MACHINE.

1,370,236.  Specification of Letters Patent.  Patented Mar. 1, 1921.

Application filed July 2, 1917. Serial No. 178,111.

*To all whom it may concern:*

Be it known that I, BURNHAM C. STICKNEY, a citizen of the United States, residing in Elizabeth, in the county of Union and State of New Jersey, have invented certain new and useful Improvements in Typewriting-Machines, of which the following is a specification.

This invention relates to an improvement in typewriting machines, and more especially to a device known as a platen release.

The invention is shown applied to the usual Underwood typewriter, and, in the typewriter illustrated in the drawings, is for the purpose of permitting a relative movement between the line-space wheel and the platen, whereby the platen can be rotated distances other than the regular line-space movements provided for by the line-space mechanism. To do this, provision is made for releasably uniting the platen with the line-space wheel. A hub or drum is provided which is rigid with the line-space wheel, and it is engaged by a flexible, clinging friction band or strap which is wrapped around the hub. The friction band is connected to the platen axle. Shifting means is provided for tightening the band around the hub, so as to join the line-space wheel rigidly to the platen. As the hub and band are not divided up by teeth arranged at any intervals, the relative positioning of the band and the hub can be for any point desired.

Several different styles or types of connecting elements are shown, any of which may be used, or any other type coming within the scope of the appended claims. In one of these types, the hub is made of fiber with a metal band gripping the same. In another type, the hub is also made of fiber, but the band is in the form of sections or links, each link including a metal block which grips the friction surface of the hub. In a third type, the hub is made of metal, and a woven or braided wire band of different hardness is wrapped around the same to form the two gripping members.

Other features and advantages will hereinafter appear.

In the accompanying drawings,

Figure 1 is a perspective view, showing one form of the device, in which a fiber hub and metal band are used. In this view, the line-space wheel is shown as disconnected from the platen, so that the platen can be rotated irregular amounts.

Fig. 2 is a spread perspective view, showing the various elements of the releasable connection between the platen and the line-space wheel.

Fig. 3 is a detail vertical section through the clutch and shifting mechanism, taken along a line approximately in the vertical plane of the platen axis.

Fig. 4 is a detail section taken at right angles to the axis of the platen, and shows the band tightening levers as open, which corresponds to the disconnected relation of the platen and line-space wheel.

Fig. 5 is a view similar to Fig. 4, except that the spreading cone has been forced into its effective position, in which position, the line-space wheel and the platen will be rigidly connected together.

Fig. 6 is a detail perspective view of a modified form of the releasable connection in which a fiber hub and metal band are used.

Fig. 7 is a detail perspective view, similar to Fig. 6, except that a metal hub and a woven wire metal band are used, the two metals being of different hardness to increase the friction.

Referring more particularly to the separate parts of this device, as embodied in the form shown in the drawings, 1 indicates a platen, which is secured to a platen axle 2. Concentric with the platen axle and rigidly secured to rotate with the platen 1, there is provided a sleeve 3. A line-space wheel 4 of the usual type is loosely mounted on the sleeve 3. This line-space wheel may be given line-space movements of from one to three teeth in the manner common to Underwood line-space mechanism. This includes briefly a pawl 5 engaging the teeth of the line-space wheel 4 at the proper moment and actuated by a slide 6 on which it is pivotally mounted. The slide 6 is operated against the tension of a spring 7 by means of a line-space lever 8 of well-known type, which is adapted to reciprocate or move to and fro.

As stated above, the line-space wheel is loosely mounted on the sleeve 3, and hence is not directly connected to the platen 1. For the purpose of connecting the line-space wheel 4 with the platen 1, so that the movements of the former will be transmitted to the latter, the line-space wheel 4 is provided with a hub 9, forming a drum, which is rigid therewith. Wrapped around the hub 9, preferably several times, there is provided a friction band 10 which may be tightened to grip the hub 9 closely, or loosened to release the same. To manipulate the band 10, the ends thereof are secured to the outer arms of levers 11 and 12, which are bent over and extended proper distances for this purpose. The levers 11 and 12 are pivoted in spaced relation intermediate their ends at 13 and 14, so that the opposite ends or arms of the levers will move in opposite directions. In other words, the outer ends of the levers 11 and 12 will move toward each other when the inner ends move away from each other, and vice versa.

The hub 9 and the band 10 form the friction elements of a releasable connection, adapted to lock the line-space wheel 4 to the platen 1, so that they may rotate in unison or independently of each other. For this purpose, the levers 11 and 12 have their pivotal mountings 13 and 14 on a disk 15 formed on the sleeve 3. As the sleeve 3 is connected rigidly to the platen 1, the band 10 rotates with the platen while the hub 9 is rigidly connected to the line-space wheel 4 and rotates with this wheel.

To cause the band 10 to tighten on and grip the hub 9, a spreading cone 16 is slidingly mounted on the axle 2 and arranged to come between the inner ends of the levers 11 and 12. The spreading cone 16 is manipulated by a button 17, located beyond the end of the platen axle 2 and connected to the cone 16 by a pair of rods 18. These rods 18 extend through openings provided in the usual platen knob 19, which is secured to the platen axle 2. Normally, the cone 16 is in the position of Fig. 5, holding the levers 11 and 12 spread apart at their inner ends, to cause the band 10 to grip the hub 9. In this position of the parts, the platen 1 will be rigidly connected with the line-space wheel 4, so that the movements of both will correspond with each other. Under such circumstances, the movements are limited to intervals corresponding to the spacing of the teeth of the line-space wheel 4, or multiples thereof, as this wheel is locked at such intervals by means of a spring-actuated roller detent 20. This detent 20 may be thrown off if desired by the usual release 21, pivotally mounted concentric with the platen axle 2 and operated by a handle 22. It is to be noted that the gripping band 10 is adapted to lock the space-wheel drum 9 and the platen-disk 15 together against torque in both directions for thereby preventing relative movement in either direction.

Various modifications in the details of connecting mechanism may be made and still come within the scope of the invention. In the form shown in Fig. 1, the hub 9 is formed of an inner metal casing or frame 23, having an outer fiber surface 24 to be engaged by the band 10. The band 10 in this case is made of some suitable flexible metal, so that there will be two friction surfaces of different character to give a high coefficient of friction. In the form shown in Fig. 6, the hub 9 is of fiber, while the band is shown in the form of a chain 25, having blocks of metal 26 which form the friction elements to engage the friction surface of the hub 9. In the form shown in Fig. 7, both the hub and the band are made of metal, but the band is woven in the form of a tape, and preferably of a somewhat softer metal than the hub, so that the friction elements will form a tightly gripping connection.

To take up the wear in the friction engaging surfaces, and for the purpose of initial adjustment, one of the levers, for example, the lever 12, is provided with a set screw 27, which is adjustable so as to vary the extent of throw of the cone shifter 16. This set screw 27 may be locked in adjusted position by a lock nut 28.

The cone 16 may be provided with a cylindrical dwell portion onto which the inner arms of the levers 11 and 12 may be forced, so that the elements of the releasable connection will be locked in their connecting relation, thereby rigidly joining the platen 1 with the line-space wheel 4, until said friction elements are positively released by manipulation of the button 17. Lost-motion may be provided between the rods 18 and the cone shifter 16, if desired, by having the rod 18 headed at 30 and extending into a circular rabbet or under-cut 31 provided in the end of the cone shifter 16.

The utility of the device will be readily understood when taken in connection with the above description. Normally, the parts are in the position of Fig. 5, with the band 10 gripping the hub 9 tightly, so that the line-space wheel 4 is rigidly connected with the platen 1. Under such circumstances, if the line-space lever 8 is operated, its movements will be transmitted, through the line-space wheel 4 and the friction connection, accurately to the platen 1, so that the line-space wheel 4 and the platen 1 will move line by line as a unit. The line-space wheel 4 will also move with the platen 1 when it is rotated by the knob 19 and with the aid of the detent 20, accurately determine the stopping points of the platen.

If it desired to move the platen 1 an irregular amount, it is merely necessary to pull out the button 17 to the Figs. 1 and 3 position, when the cone 16 will be withdrawn from its inner position between the inner arms of the levers 11 and 12. This will permit the inner arms of the levers to come together while the outer arms of the levers spread apart, loosening up on the band 10.

Thus, the friction between the band 10 and the hub 9 is greatly lessened, so that the line-space wheel 4 and the platen 1 may have a relative motion. Generally this is done by rotating the hand-knob 19 until the desired point on the platen comes into register with the printing point of the typewriter. When the platen is thus positioned, the line-space wheel 4 may be once more rigidly connected to the platen by forcing in the button 17. This action spreads the inner ends of the levers 11 and 12, closing the outer ends of the levers toward each other, thereby pulling upon the band 10 at both ends to tighten it on the hub 9, thus forming once more a rigid connection between the line-space wheel 4 and the platen 1. The platen 1 will now be accurately held at the new line-space position by the detent 20.

Variations may be resorted to within the scope of the invention, and portions of the improvements may be used without others.

Having thus described my invention, I claim:

1. The combination with a platen, of a line-space wheel for said platen, a hub secured to said line-space wheel, a flexible friction member wrapped around said hub and anchored to said platen, and means for tightening said flexible friction member on said hub, so as to form a rigid connection between said platen and said line-space wheel.

2. The combination with a platen, of a line-space wheel for said platen, a hub secured to said line-space wheel, a flexible friction member wrapped around said hub and connected to said platen, means normally maintaining said friction member tight on said hub, so as to rigidly join said line-space wheel with said platen, and a release for loosening said flexible friction member so as to enable a rotation of said platen independently of said line-space wheel.

3. The combination with a platen, of a line-space wheel for said platen, a hub secured to said line-space wheel, a flexible friction member wrapped around said hub, a pair of levers connected to rotate with said platen, and means for swinging said levers so as to tighten and loosen said flexible member on said hub.

4. The combination with a platen, of a sleeve connected to said platen, a line-space wheel loosely mounted on said sleeve, a hub rigidly connected to said line-space wheel, a disk rigidly connected to said sleeve, a pair of levers pivotally mounted on said disk, and a flexible friction member wrapped around said hub and connected to be operated by said levers, so as to determine the connection of said line-space wheel with said platen.

5. The combination with a platen, of an axle for said platen, a knob secured to said axle to rotate said platen, a line-space wheel for rotating said platen, a hub secured to said line-space wheel, a flexible band wrapped around said hub, means normally tightening said band on said hub, so as to rigidly connect said line-space wheel with said platen, enabling the rotation of the former to be transmitted to the latter, and a release for disconnecting said line-space wheel from said platen by loosening said flexible band, whereby said platen may be rotated by said knob while said line-space wheel remains stationary.

6. The combination with a platen, of a line-space wheel for said platen, a hub secured to said line-space wheel, a flexible friction member wrapped around said hub, levers connected to rotate with said platen and connected to the ends of said flexible friction member, a cone for rocking said levers, so as to tighten said flexible friction member on said hub, and means for shifting said cone so as to control the connection and disconnection of said line-space wheel with said platen by said hub and said flexible friction member.

7. The combination with a platen, of a line-space wheel releasably connected thereto by a connection comprising a flexible band having separate ends, manually controlled means engaging the ends of the band to tighten the same, and a drum or device around which the band is wound.

8. The combination with a platen, of a line-space wheel releasably connected thereto by a connection comprising a flexible band, manually controlled means engaging the ends of the band to tighten the same, and a drum or device around which the band is wound more than once.

9. The combination with a platen, of a line-space wheel releasably connected thereto by a connection comprising a flexible band, manually controlled means engaging the ends of the band to tighten the same, and a drum or device around which the band is wound more than once; said band in the form of a chain.

10. The combination with a platen, of a line-space wheel releasably connected thereto by a platen-driving friction device comprising a drum, a flexible helical band wound around the drum more than once with the windings side by side to contact with the surface of the drum, and means connected to the ends of the band to coöperate either to tighten or loosen the windings of the band upon said surface at will.

11. The combination with a platen, of a line-space wheel for said platen, a hub secured to said line-space wheel, a flexible friction member wrapped around said hub and anchored to said platen, and means for tightening said flexible friction member on said hub, to form a rigid connection between said platen and said line-space wheel, effective on both the advance and reverse rotation of the platen.

12. The combination with a platen, of a line-space wheel for said platen, a hub secured to said line-space wheel, a flexible friction member wrapped around said hub and connected to said platen, means normally maintaining said friction member tight on said hub, to join said line-space wheel rigidly with said platen, to be effective on both the advance and reverse rotation of the platen, and a release for loosening said flexible friction member so as to enable a rotation of said platen independently of said line-space wheel.

13. The combination with a platen, of a line-space wheel for said platen, a hub secured to said line-space wheel, a flexible friction member wrapped around said hub, a pair of levers connected to rotate with said platen, and means for swinging said levers to tighten and loosen said flexible member on said hub, said friction member capable of locking the line-space wheel and the platen together for both advance and return rotation of the platen.

14. The combination with a platen, of a sleeve connected to said platen, a line-space wheel loosely mounted on said sleeve, a hub rigidly connected to said line-space wheel, a disk rigidly connected to said sleeve, a pair of levers pivotally mounted on said disk, and a flexible friction member wrapped around said hub and connected to be operated by said levers, to determine the connection of said line-space wheel with said platen for both the advance and return rotation of the platen.

15. The combination with a platen, of an axle for said platen, a knob secured to said axle to rotate said platen, a line-space wheel for rotating said platen, a hub secured to said line-space wheel, a flexible band wrapped around said hub, means normally tightening said band on said hub, so as to rigidly connect said line-space wheel with said platen for both advance and return rotation of the platen, enabling the rotation of the wheel to be transmitted to the platen, and a release for disconnecting said line-space wheel from said platen by loosening said flexible band, whereby said platen may be rotated by said knob while said line-space wheel remains stationary.

16. The combination with a platen, of a line-space wheel releasably connected thereto by a connection comprising a flexible band having separate ends, manually-controlled means engaging the ends of the band to tighten the same, and a drum or device around which the band is wound, to lock the line-space wheel and platen together for both advance and return rotation of the platen.

17. The combination with a platen, of a line-space wheel releasably connected thereto by a connection comprising a flexible band, manually-controlled means engaging the ends of the band to tighten the same, and a drum or device around which the band is wound more than once, to lock the line-space wheel and platen together for both advance and return rotation of the platen.

18. A platen-driving friction device comprising a drum, a flexible band wound around the drum more than once, and oppositely-pulling means connected to the ends of the band to coöperate either to tighten or loosen the band at will, to lock the line-space wheel and platen together for both advance and return rotation of the platen.

19. A flexible band pulled in opposite directions by its ends, a drum around which the band is wound, and a platen and line-space wheel connected by said drum and band, to lock the line-space wheel and platen together for both advance and return rotation of the platen.

20. A platen-driving friction device comprising a drum, a flexible band wound around the drum more than once, oppositely-pulling members connected to the ends of the band to coöperate either to tighten or loosen the windings of the band at will, and a device movable axially of the platen to draw the band tight around the drum to enable it to drive the platen backwardly or forwardly.

21. A flexible band having two ends, a drum around which the band is wound, a line-space wheel fast to the drum, a platen axially alined with the line-space wheel, an axle for the platen, levers connected to said axle and drawing on the ends of the band to grip the line-space wheel to the axle, and a device shiftable along the length of the axle to operate the levers.

22. In a typewriting machine having a rotative platen, line-spacing means including a toothed line-space wheel for rotating the platen, a platen-holding detent coöperative with the line-space wheel, and manually-operable means including a line-spacing handle for rotating the line-space wheel to line-space the platen; the combination of releasable locking means for connecting the line-space wheel to the platen, such locking means comprising a rotative member carried by the platen and another rotative member carried by the line-space wheel, a helical friction band anchored to one of said members and wound more than once around the other of said members and adapted frictionally to grip said member about which it is wound for locking the line-space wheel and the platen together for both advance and return rotation of the platen, and means connected to the ends of said band for causing said band to grip or to release said member about which it is wound, whereby the platen may be rotated by means of or independently of the line-space wheel.

23. In a typewriting machine, in combination, a rotative line-feeding platen, a reciprocating line-spacing handle, and a connecting train between the handle and the platen including a drum, a helical friction band wound more than once around the drum with the windings side by side to contact with the drum, and means connected to the ends of the band for causing the windings of the band to tighten and grip the drum or to loosen and release the drum.

BURNHAM C. STICKNEY.

Witnesses:
 EDITH B. LIBBEY,
 CATHERINE A. NEWELL.